Sept. 20, 1938.   G. O. SUNDQVIST   2,130,828
RAKE
Filed Sept. 18, 1935

Inventor:
Gustav Oskar Sundqvist

Patented Sept. 20, 1938

2,130,828

UNITED STATES PATENT OFFICE 2,130,828

RAKE

Gustav Oskar Sundqvist, Stockholm, Sweden, assignor to Gunnar Östberg, Stockholm, Sweden Application September 18, 1935, Serial No. 41,114
In Sweden September 19, 1934

2 Claims. (Cl. 55—114)

This invention relates to improvements in straight-fronted fan-shaped rakes.

It is previously proposed to provide a rake, in which the rake head is of an inverted channel form with apertures in the front wall and upper surface and notches in the rear wall for receiving interchangeable teeth. The rear end of each tooth is bent to form a spring loop and the extreme end terminates into a hook. Each said tooth passes through an aperture in the front wall and a notch in the rear wall. The hook engages with one of the apertures in the upper surface of the rake head in such a manner that the spring loop projects a substantial distance forwardly beyond the rear wall of the rake head.

According to this invention the rake has interchangeable teeth fixed in the shape of a fan in a rake head, said head consisting of a piece of sheet metal, all teeth being exactly of the same length and shape. Devices are provided for fixing the teeth to the rear wall of the rake head, said devices being so placed on either side of the median line of the rake on lines converging symmetrically backwards, that the points of the teeth are in a straight line and equidistant from one another, the rear end of the teeth being bent to form a spring loop, said spring loop lying closely against the rear wall and the upper surface of the rake head in notches provided in said rear wall and upper surface, the lateral superficies of said notches forming guideways for the rear end of the teeth, thus preventing the teeth turning round, the ends being provided with a hook for snapping into a hole on the upper surface of the rake head, while the teeth are otherwise held in position by holes and notches in the bent-down front and rear walls respectively of the rake head.

With the above and other objects in view the invention consists of certain novel features of construction, combination and arrangements of parts as will hereinafter be described and claimed.

Figure 1:
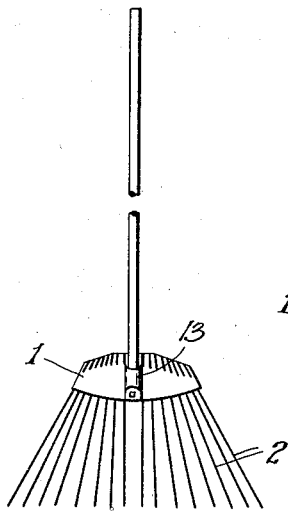
Figure 2:
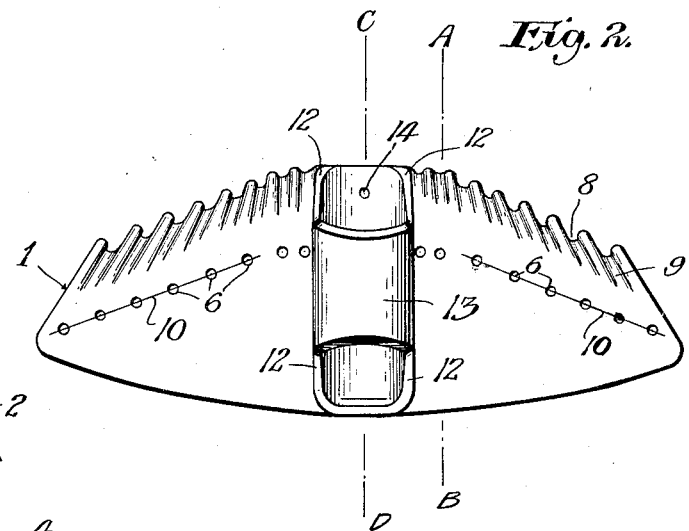
Figure 3:
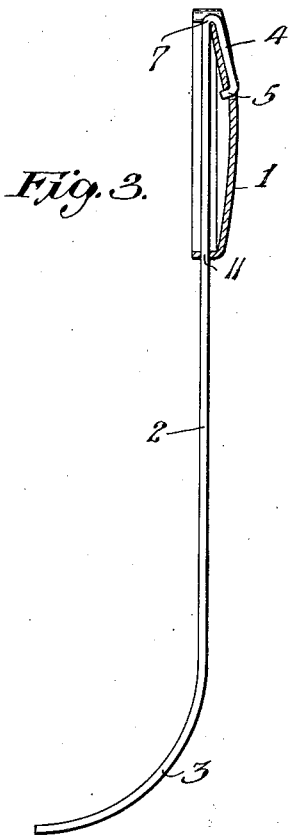
Figure 4:
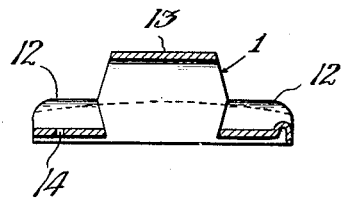

In the accompanying drawing Figure 1 is a plan view of a rake, Fig. 2 is an enlarged plan view of the rake head, Fig. 3 is a side view in section along a line A—B in Fig. 2 and Fig. 4 is a section along a line C—D in Fig. 2.

Referring more particularly to the drawing 1 denotes a rake head consisting of a piece of sheet metal, to which a handle is adapted to be fixed. The edges of the rake head are bent down and well rounded on the front and back walls. The front part of the teeth 2 is bent in an even curve 3, and their rear ends 4 are bent back to form a spring loop and a hook 5 intended to snap into a hole 6 on the upper surface of the rake head. The rear ends of the teeth rest in notches 7 in the rear wall and in pressed notches 8 in the rear wall and in notches 9 in the upper surface of the rake head, said notches holding the ends firmly laterally. The holes 6 and the notches 7, 8 are thus devices for fixing the teeth to the back wall of the rake head. These devices are arranged on converging lines (lines 10 for the holes 6), which converge symmetrically backwards. The straight part of the teeth passes through the holes in the front wall, which holes are formed as long-holes 11 if lateral flexibility is desired.

Owing to the peculiar shape of the rake head the socket for the handle is made by the rake head itself. The rake head longitudinal stiffening ridges 12 are pressed on either side of the median line at the front and back ends of the rake head, the ridges of each pair being joined by a pressed strip, semicircular in cross-section for encompassing approximately half the underside of the handle, the rake head between said strips being pressed semicircular, 13, in cross-section for encompassing the upper side of the handle. The handle is fixed by a screw or nail through one or more holes 14.

Various changes in the form, proportion and details of construction may be resorted to without departing from the principle or sacrificing any of the advantages of this invention as defined by the appended claims.

Having thus described my invention, what I claim as new and desire to secure by Letters-Patent is:

1. In an improved fan-shaped rake having a head comprising an upper surface, a front wall and a rear wall, interchangeable teeth, all teeth being exactly of the same length and shape, devices for fixing the teeth to the rear part of the rake head being so placed on connecting-lines converging symmetrically backwards that the forward ends of the teeth are in a straight line and equidistant from one another, the rear ends of the teeth being bent to form spring loops lying closely against said rear part of the rake head and the upper surface of the rake head between lateral superficies of notches provided in said rear part of the rake head and the upper surface of the rake head, the extreme end of the spring loop being provided with a hook for snapping in a hole on the upper surface of the rake head, while the teeth are otherwise held by holes and notches in the front and rear walls of the rake head.

2. In an improved rake as claimed in claim 1, a handle socket formed in the rake head and comprising a front and a rear pair of longitudinal stiffening ridges, the ridges of each pair being joined by a pressed strip, semicircular in cross-section for encompassing approximately half the underside of the handle, the rake head between said strips being pressed semicircular in cross-section for encompassing the upper side of the handle.

GUSTAV OSKAR SUNDQVIST.